G. E. HULSE.
MANTLE PROTECTOR AND HOLDER.
APPLICATION FILED JUNE 9, 1908.
948,995.
Patented Feb. 15, 1910.
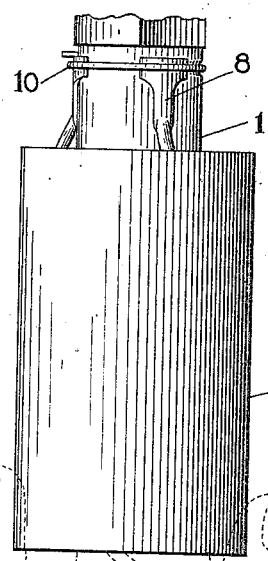
Fig. 5.
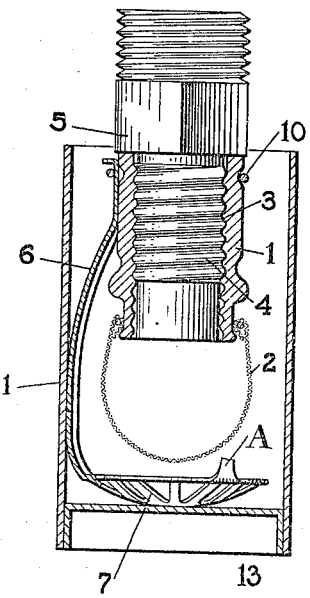
Fig. 4.
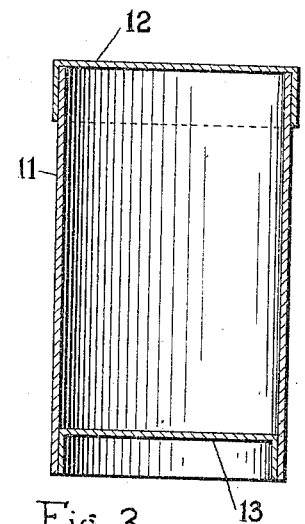
Fig. 3.
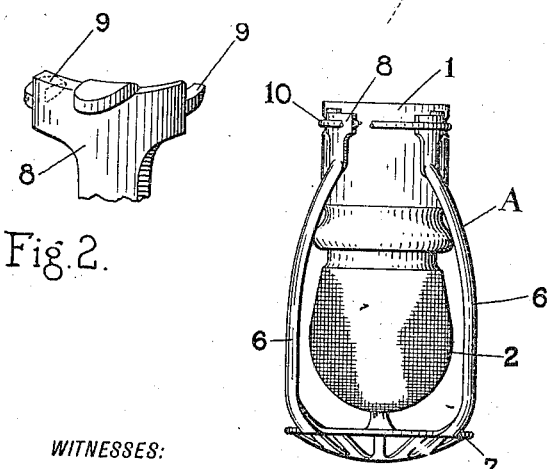
Fig. 2.
Fig. 1.
WITNESSES:
H. C. Lummis
Paul A. Wolff
INVENTOR
G. E. Hulse
ATTORNEY

UNITED STATES PATENT OFFICE.

GEORGE E. HULSE, OF NEWARK, NEW JERSEY, ASSIGNOR TO SAFETY CAR HEATING & LIGHTING COMPANY, A CORPORATION OF NEW JERSEY.

MANTLE PROTECTOR AND HOLDER.

948,995.  Specification of Letters Patent.  Patented Feb. 15, 1910.

Application filed June 9, 1908. Serial No. 437,485.

*To all whom it may concern:*

Be it known that I, GEORGE E. HULSE, a citizen of the United States, residing at Newark, in the county of Essex and State of New Jersey, have invented certain new and useful Improvements in Mantle Protectors and Holders, of which the following is a full, clear, and exact description, such as will enable others skilled in the art to which it appertains to make and use the same.

This invention relates broadly to mantle fixtures, but inasmuch as certain advantages characteristic thereof prominently appear in its more intense aspect as a unitary mantle container and applier, it will be conducive to a more complete disclosure to detail such embodiment thereof.

This invention has in view, among other objects, the provision of a unitary fixture in which the mantle, as well as the means instrumental in attaching it to a depending burner tube, are removably contained within a receptacle or casing suitable for commercial shipments and handlings of the device.

Another object falling within the contemplation of this invention is to provide a mantle and its supporting means with a protector of such perforate or open work structure that substantially the full and complete light emitting qualities of the mantle will be usefully realized, while at the same time the mantle will be well protected against accidental abrasions or contacts.

In general, this invention seeks to provide a unitary device of the nature mentioned, which will be efficient in operation, capable of being handled with facility, and which will be of a simple construction suitable for being manufactured at a reasonable cost.

Other objects and advantages will be in part obvious from the annexed drawings and in part pointed out hereinafter.

As tending to a more complete disclosure of the several aspects of this invention, illustrations of its preferred embodiment have been annexed. In such drawings like characters of reference denote corresponding parts throughout the several views of which:

Figure 1 is a side elevation illustrating the combined mantle and protector therefor detached from the burner tube and removed from its box. Fig. 2 is a detail illustrating one of the many available expedients which may be employed for securing the protector to the mantle support. Fig. 3 is a vertical section of a box or receptacle which may be employed for containing the unitary device shown by Fig. 1, and which serves on the one hand to attach such device to the burner tube, and on the other hand as a convenient shipment casing. Fig. 4 is a vertical section showing the device applied to a depending burner tube preparatory to removing the receptacle or box. Fig. 5 is a vertical elevation showing the relation between the fingers and the receptacle in the act of removing the latter from the mantle and the protector.

Continuing now by way of a more detailed description, making occasional reference to the drawings as indicated by the reference characters, 1 denotes a spool or mantle support which carries a mantle 2 depending from the lower end thereof and preferably permanently secured to such end. This mantle spool may, of course, assume divers shapes and may be composed of various materials, but I prefer to construct the same of compact asbestos and give the same an annular or cylindrical shape, such as that indicated by the drawings. This mantle support may be provided with interior threads 3 adapted to be screwed on an exteriorly threaded counterpart 4, which may be the lowermost extremity of a depending burner tube. A suitable abutment such as that indicated by 5 will suffice for limiting the extent of movement onto the burner tube of the mantle supporting spool.

As a means instrumental in transmitting the rotation of the receptacle to the mantle support, when the latter is being secured to the burner tube, I have employed an intervening member which also serves, in this embodiment of my invention, as a cage for guarding the mantle against injury. This member, designated generally by A, comprises a plurality of outwardly and downwardly bulging legs 6, which are preferably, but not necessarily, connected at their lower extremities as by means of a perforate plate 7 underlying the mantle. The upper ends of the legs 6 are here shown attached to the spool or mantle support 1. Obviously, many convenient and available modes of making this attachment will be apparent, and as exemplifying the same, I have here shown one method in which the upper ends of the legs 6 are provided with flattened segmental ends 8 having prongs 9 which are embedded in the material of the spool 1. A wire 10 may encircle such ends to prevent a withdrawal of the prongs. Of course, while I have shown the protector A in attached relation to the mantle support, it will be evident that the same may be integral therewith, if desired, and the whole may be stamped of one piece.

Coöperating with the aforesaid parts, and more directly with the protector A, is a suitable receptacle 11, which may be cylindrical or polygonal in form, and which may be provided with a cap 12 and a bottom 13. The protector and the parts attached thereto will be inserted as a unit in this receptacle until the perforate bottom plate, which rests upon the bottom 13 of the receptacle, and the downwardly and outwardly flaring legs 6 frictionally engage against the sides of the receptacle, as is shown more clearly in Fig. 4 with the cap in place, this self-contained device may be shipped and handled with great facility.

The operation of replacing a mantle upon a burner tube by means of the hereindisclosed invention is most simple. The cap 12 will be removed and the end of the burner tubes screwed into the mantle spool 1 until a sufficiently tight relation between the two has been brought about. Owing to the fact that the legs 6 bear against the annular wall of the receptacle there will be sufficient friction to prevent a relative depending movement between the protector A and the receptacle. With the parts properly positioned the receptacle or casing may be instantly removed by simply pulling the same downwardly which leaves the mantle and protector on the burner tube in condition for immediate use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention what I claim as new and desire to secure by Letters Patent is:

1. A device of the nature disclosed comprising in combination, a mantle support adapted to be detachably secured to a burner tube, a mantle permanently secured to said support in pendent relation therewith, a protector secured to said mantle support encaging said mantle, and a receptacle resistingly containing said protector adapted to be withdrawn therefrom.

2. A device of the nature disclosed comprising in combination, an interiorly threaded mantle support adapted to be detachably threaded on an exteriorly threaded burner tube, a mantle permanently secured in pendent relation to said support, a protector secured to said support and encaging said mantle, and a receptacle resistingly containing said protector and adapted to be withdrawn therefrom.

3. A device of the nature disclosed, comprising in combination, a mantle support adapted to be detachably secured to a burner tube, a mantle permanently depending from said support, a protector secured to said support and providing a plurality of outwardly extending arms encaging said mantle, and a receptacle frictionally engaging said arms and adapted to be withdrawn therefrom.

4. A device of the nature disclosed comprising in combination, a mantle support adapted to be detachably secured to a burner tube, a mantle permanently depending from said support, a protector secured to said support having a plurality of arms spreading downwardly and outwardly to encage said mantle, and a cylindrical receptacle frictionally engaging the outermost portions of said protector and adapted to be manually withdrawn therefrom.

5. A device of the nature disclosed comprising in combination, a mantle support adapted to be detachably secured to a depending burner tube, a mantle depending from the lower end of said support, a protector carried by said support and having arms flaring downwardly therefrom, said arms being connected at their lower ends, and a receptacle frictionally engaging the outermost portions of said protector whereby the latter may be withdrawn from said receptacle.

6. A device of the nature disclosed comprising in combination, a mantle support adapted to be detachably secured to a depending burner tube, a mantle depending from said support, protecting means extending downwardly from said support and arranged to encage said mantle, and a receptacle engaged by said protecting means and adapted to be separated therefrom.

7. A device of the nature disclosed comprising in combination, a depending mantle, a protector encaging said mantle, means establishing a permanent relation between said protector and mantle, means detachably securing the aforesaid parts as a unit to a depending burner tube, and a receptacle detachably retaining said protector.

8. A device of the nature disclosed comprising, in combination, a mantle support, a mantle permanently secured to said support in pendent relation therewith, a protector secured to said mantle support encaging said mantle and providing downwardly extending arms supporting a plate beneath said mantle.

9. A device of the nature disclosed comprising, in combination, a mantle support, a mantle permanently secured to said support in pendent relation therewith, a protector secured to said mantle support encaging said mantle and providing downwardly and outwardly extending arms supporting a perforated plate beneath said mantle, and a receptacle resistingly containing said protector and adapted to be withdrawn therefrom.

10. A metallic mantle protective device comprising a plurality of spaced supporting arms secured to a perforated plate whereby the light is freely emitted between said arms and the mantle fully protected in the direction of said plate.

11. In combination, a burner, a pendent mantle operatively related to said burner, a perforated protective member, and means secured to said protective member and supporting the same in a position entirely below and out of contact with said mantle whereby the light is freely emitted laterally from said mantle and the same is guarded from an upward blow.

In testimony whereof I affix my signature, in the presence of two witnesses.

GEORGE E. HULSE.

Witnesses:
JOHN T. CLARK,
E. E. ALLBEE.